Dec. 20, 1960
O. K. KELLEY
2,964,976
TRANSMISSION
Original Filed Dec. 10, 1956
3 Sheets-Sheet 1
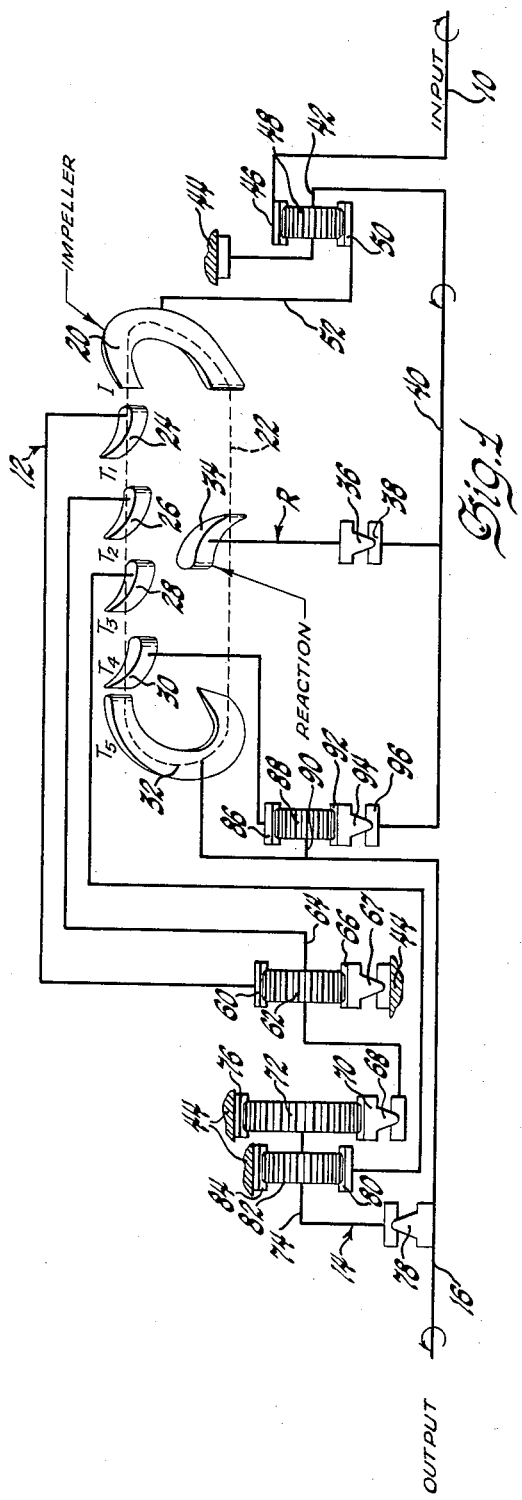
INVENTOR.
Oliver K. Kelley
BY
T. L. Chisholm
ATTORNEY Dec. 20, 1960

O. K. KELLEY 2,964,976

TRANSMISSION

Original Filed Dec. 10, 1956

INVENTOR.
Oliver K. Kelley
BY
T. R. Chisholm
ATTORNEY

Dec. 20, 1960
O. K. KELLEY
2,964,976
TRANSMISSION
Original Filed Dec. 10, 1956
3 Sheets-Sheet 3
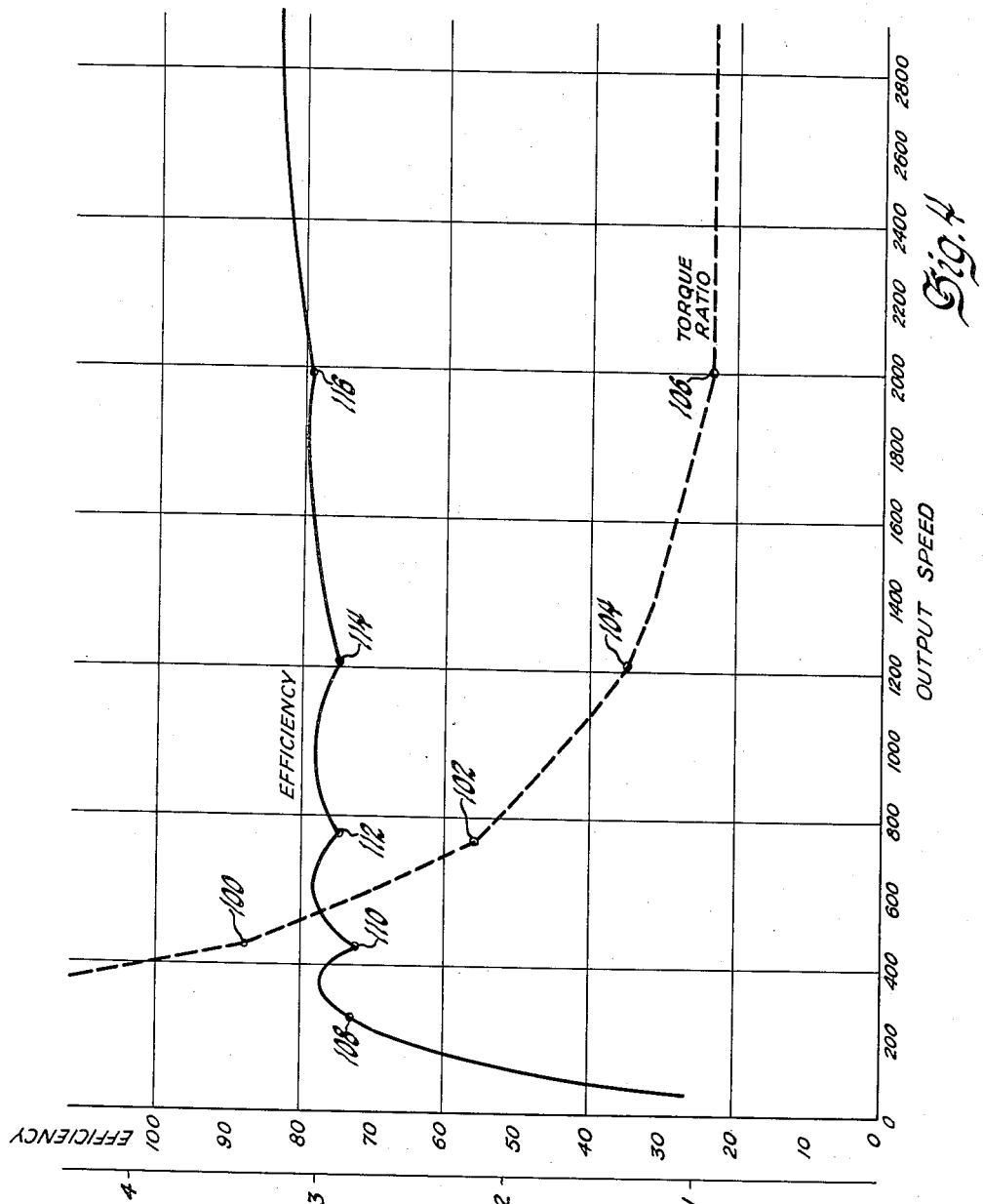
INVENTOR.
Oliver K. Kelley
BY
T. R. Chisholm
ATTORNEY

United States Patent Office 2,964,976
Patented Dec. 20, 1960

2,964,976

TRANSMISSION

Oliver K. Kelley, Bloomfield Hills, Mich., assignor to General Motors Corporation, Detroit, Mich., a corporation of Delaware Original application Dec. 10, 1956, Ser. No. 627,485. Divided and this application Jan. 13, 1958, Ser. No. 708,581

10 Claims. (Cl. 74—677)

This application is a division of my application Serial No. 627,485 filed December 10, 1956, and now abandoned.

This invention relates to improvements in hydrodynamic torque transfer and/or multiplying devices and associated gearing for driving a power output member at various speed ratios from a power input member. These are particularly, although not exclusively, suited to transmissions for motor vehicles, especially heavy vehicles such as locomotives, and such as transmission is described herein as one example of a device to which my invention may be applied. Also, the invention is suitable for torque converters or speed reducers which multiply torque, but some features of the invention are applicable to transmissions generally.

It is known that a turbine of a hydrodynamic torque converter can readily be constructed to provide any practical degree of torque multiplication on starting, but if the torque multiplication is sufficiently high on starting then the torque of the turbine vanishes at an impractically low turbine speed. This provides poor acceleration and may furnish little or no torque as the device approaches coupling or one-to-one speed ratio. On the other hand, a turbine can be constructed to provide acceptable coupling characteristics if or when the turbine reaches approximate impeller speed, but this is done at a sacrifice of starting or stall torque and accelerating torque in the middle ranges of speed.

The foregoing considerations have lead to the design and construction of hydrodynamic torque transfer devices, especially torque converters having various arrangements of multiple turbines of varying torque characteristics with or without torque multiplying gearing. Many of those proposed or constructed operate satisfactorily within inherent limitations which it has heretofore been impractical to avoid, but they have the disadvantage of maintaining inadequate torque multiplication during intermediate speed ranges. These have produced vehicles which have been sluggish in performance after starting. Such known devices frequently have been of low efficiency requiring high operating costs.

My invention seeks to overcome these and other disadvantages of known hydrodynamic transmissions and to provide an improved transmission which changes torque ratio smoothly and continuously, that is by infinitely small increments, without shifting of mechanical torque multiplying devices such as gears. It seeks to improve the efficiency of torque converters and to provide a hydrodynamic torque converter which has a high starting torque ratio, and maintains a higher torque ratio than was formerly had during acceleration to one-to-one drive. In particular I want to provide a rugged and powerful transmission of high torque ratio suitable for heavy vehicles such as railway switching locomotives.

Any converter turbine has the inherent characteristic of providing diminishing torque multiplication as the turbine speed increases toward impeller speed, as long as the turbine is operating alone, by which I mean that there is no other turbine ahead of the turbine under consideration in the liquid stream from the impeller, which other turbine is delivering torque. I combine a series of such turbines, of different torque characteristics, in such a way that as the torque multiplication or torque ratio of one turbine decreases the torque ratios of downstream turbines increase. By providing a sufficient number of such turbines the torque ratio of the torque converter as a whole decreases toward coupling much more slowly than heretofore, and stays at practically high values over long periods of acceleration of the vehicle because while the turbines of the series are successively fading out, that is their torque multiplications are decreasing toward zero, the downstream turbines are increasing their torque ratios. This provides a maneuverable vehicle of high performance.

Preferably, I combine a series of axial flow turbines with a radial inflow turbine and connection each turbine to an output shaft by a mechanical connection having a lower mechanical advantage than that of the connection of the preceding turbine of the series, the last one being direct or one-to-one. Preferably also, the connection of the final or radial inflow turbine is two-way and the connections of all the other turbines are free-wheeling. In this way during acceleration of the vehicle each turbine runs faster than the next turbine downstream, and as each turbine, except the last, approaches its terminal speed and its torque consequently vanishes, that turbine is disconnected from the output shaft, and is free to float or turn idly in the oil stream, neither putting out torque nor taking up any significant amount. For all practical purposes, except for factors such as friction losses each free-wheeling turbine may be considered as removed from the transmission.

The foregoing and other objects and advantages of the invention will be apparent from the annexed description and from the accompanying drawings, in which:

Fig. 1 shows schematically one-half of a longitudinal section of a transmission embodying one form of the invention;

Fig. 2 is a developed view showing the cross sections of blades on the cylinder determined by the line 22 in Fig. 1 and showing the relationship of the various rotating parts of the hydrodynamic torque converter;

Figure 3:
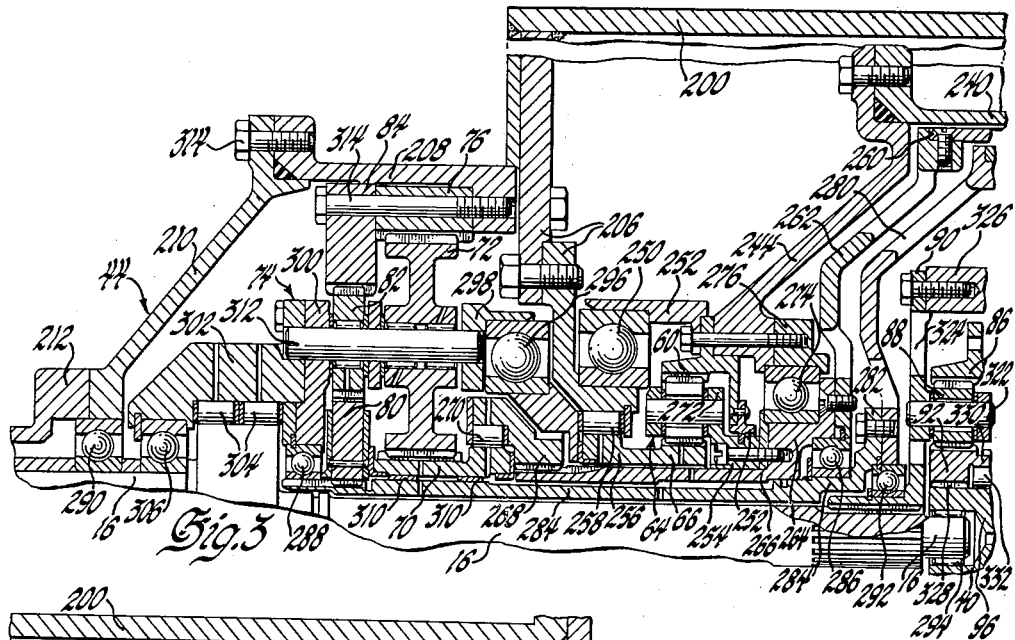
Figure 3A:
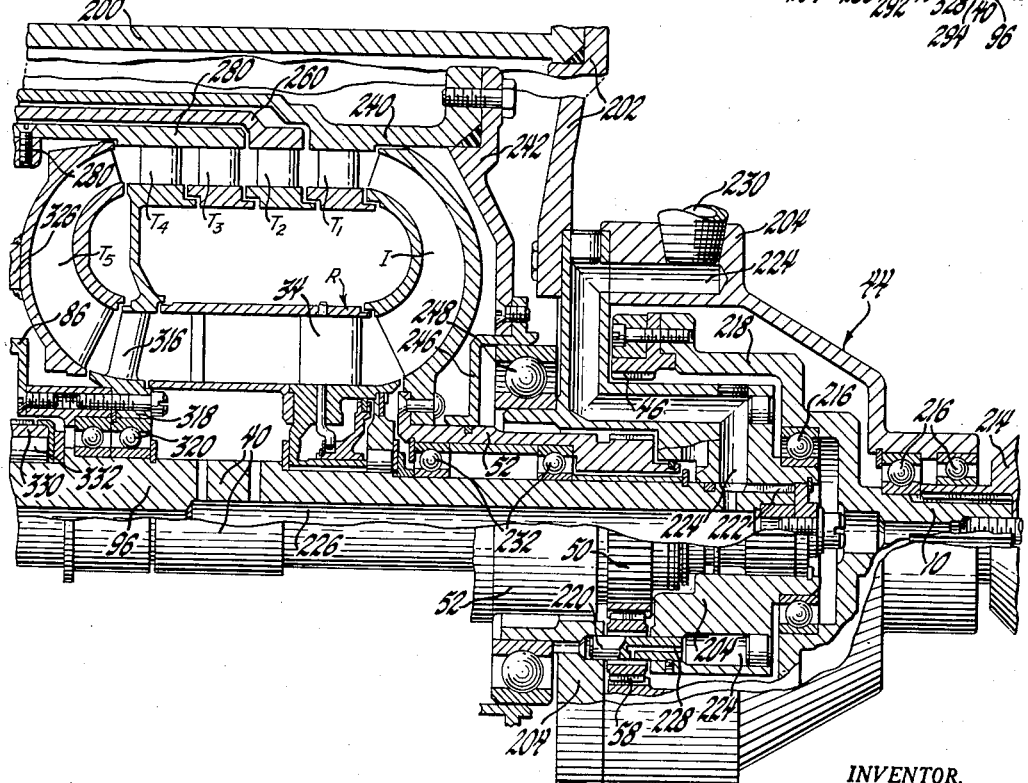

Figs. 3 and 3A collectively constitute one-half of a symmetrical longitudinal section of the actual structure of a transmission embodying one form of the invention, Fig. 3 fitting on the left of Fig. 3A, and Fig. 4 is a diagram of speed, torque and efficiency curves of a transmission embodying the invention.

General diagrammatic arrangement

Referring to Fig. 1 the transmission in general includes an input shaft 10 at the right of the drawing, which drives a torque converter 12 which drives planetary reduction gearing, collectively designated 14, which drives an output shaft 16 which may be connected through any suitable forward and reverse gear, not shown, to the drive wheels of a locomotive. The construction and arrangement of the torque converter separately, of the planetary gearing separately and of the two in combination with each other are believed to include novel features.

The torque converter includes a pump or impeller I of generally known form, represented diagrammatically in Fig. 1 by a single blade 20, rotated by the input shaft 10, as will be explained, and circulating working liquid in a closed toroidal path, represented by the dotted line 22. A first turbine $T_1$ represented in Fig. 1 by a single blade 24 receives liquid from the impeller and delivers liquid to a second turbine $T_2$ represented by blade 26 from which the liquid flows to a third turbine $T_3$ represented by blade 28 which delivers the liquid to a fourth turbine $T_4$ represented by blade 30, from which the liquid flows to a fifth or final turbine $T_5$, represented by blade 32. The liquid discharged by $T_5$ returns to the impeller I through a reaction member or guide wheel R of known form represented by blade 34. The reaction member is locked against reverse rotation by any suitable form of one-way torque-establishing device 35 or free wheeler having sprags or rollers 36 which run free in the direction indicated by the point 37 but are locked against reverse rotation by a member 38 fixed to a shaft 40 secured against rotation to the frame of the transmission, as will be explained.

In order to have the shaft 40 grounded or fixed against rotation with respect to the frame of the transmission and yet have the drive for the impeller come in at the right-hand end of the transmission, the drive arrangement shown in Figs. 1 and 3A is preferably used. The ground shaft 40 is fixed to a support for shafts 42 having a form similar to an epicyclic or planetary carrier which is fixed to the frame 44 of the transmission. The input shaft 10 drives a ring gear 46 meshing with any suitable number of gears 48 (only one of which is shown in Fig. 1) journalled on shafts 42 which gears drive a gear 50 similar to a sun gear which rotates the impeller through a drive sleeve 52. In this way a rotary drive from the input shaft to the impeller passes through the support of the stationary shaft 40 and makes convenient the construction and assembly of the torque converter and its associated gearing.

The first turbine $T_1$ is connected to drive an input ring gear 60 of a first planetary gear set which includes planet pinion 62 journalled on an output carrier 64 and meshing with a reaction sun gear 66 connected to the frame 44 through a one-way torque-establishing device 67 which prevents reverse rotation but permits forward rotation of the sun gear, as is known.

The second turbine $T_2$ is connected directly to the carrier 64. The carrier 64 also drives through a one-way torque-establishing device 68, an input sun gear 70 of a second planetary gear set which includes planetary pinion 72 mounted on an output carrier 74 and meshing with the sun gear 70 and with a stationary reaction ring gear 76. Rotation of the carrier 64 forward rotates the sun gear 70 forward and this rotates the carrier 74 forward which through a one-way torque-establishing device 78 drives the output shaft 16 forward.

The carrier 74 may also be driven by a third planetary gear set, the input sun gear 80 of which is driven directly by the third turbine $T_3$. This drives planets 82 journalled on the previously mentioned carrier 74 and meshing with a stationary reaction ring gear 84. The output shaft 16 is also driven by the fourth turbine $T_4$ which drives the input ring gear 86 of a fourth planetary gear set having planet pinions 88 journalled on a carrier 90 and meshing with a reaction sun gear 92 which is held against reverse rotation by a one-way torque-establishing device 94 between the sun 92 and the ground shaft 40. The carrier 90 is fixed to the output shaft 16. The output shaft 16 is also driven by the fifth turbine $T_5$ which is connected directly to the carrier 90.

The apparatus as so far described operates as follows:

Assume that the input shaft 10 rotates backward or clockwise, as seen from the right of Fig. 1. This rotates the impeller I forward or counterclockwise, as seen from the right of Fig. 1 so that the impeller blade 20 moves forward toward the eye of the observer. Oil circulating in the path 22 simultaneously impresses torque on all five turbine blades. Initially the load shaft 16 is held stationary by the vehicle wheels so that none of the turbines can rotate. This condition is known as stall. The design and relationship of the turbine blades is such that at stall $T_1$ has impressed upon it the highest positive or forward torque from the liquid circulated by the impeller and the positive torque on the succeeding turbines of the series decreases progressively, being least on $T_5$. In fact, depending on the design of the turbines the torque at stall on some of the turbine blades can be negative. Even so $T_1$ drives the carrier 64 at reduced speed which in turn drives the input sun gear 70 at reduced speed, which drives carrier 74 at further reduced speed, thus impressing a double speed reduction, and a consequent double torque multiplication, on the output shaft 16. This positively carries all the other turbines forward, due to their connections to the gearing, and this occurs even in spite of any negative torque on some of the turbines, because the mechanical advantage of the connection of $T_1$ to shaft 16 is the highest of all the turbine connections.

As the shaft 16 begins to move, driven mainly by $T_1$, $T_2$ is simultaneously impressing torque on the carrier 64 directly, driving the carrier 74 and the output shaft 16 through a single speed reduction or single torque multiplication through the gearset 70—72—76. Simultaneously $T_3$ is impressing torque on the carrier 74 and on the output shaft 16 through the single speed reduction of the planetary gear set 80—82—84 and is adding its torque as multiplied by the latter planetary gear set to the torque of the preceding turbines. Also $T_4$ is adding its torque to the output shaft 16 through the multiplication of the planetary gear set 86—88—92, and turbine $T_5$ is adding its torque directly to the output shaft 16 through its constant connection thereto through carrier 90.

As the locomotive begins to move the turbines begin to turn at different speeds as determined by the ratios of the various planetary gear sets. Inherently all of the turbines increase in speed and drive the output shaft faster as the resistance to motion of the output shaft decreases. $T_1$ turns faster than $T_2$, which turns faster than $T_3$, which in turn is faster than $T_4$, which in turn is faster than $T_5$. It is known that as each turbine increases in speed, its torque inherently decreases. As $T_1$ approaches its terminal speed, $T_2$ reaches a point where it drives the carrier 64 faster than $T_1$ can drive that carrier through the speed reduction of the planetary gear set 60—62—66, and the torque exerted by $T_2$ on the carrier 64 becomes greater than the torque which can be exerted on this carrier at this speed by the turbine $T_1$ through the ring gear 60. At this point the one-way torque-establishing device 67 breaks away and $T_1$ is disconnected mechanically from the system. The sun gear 66 rotates forward and the turbine $T_1$ floats idly in the oil stream neither absorbing nor delivering any appreciable torque. The ring gear 60 and the sun gear 66 are rotating at the same speed about the axis of the transmission as the carrier 64.

As $T_2$ approaches its terminal speed its torque decreases and eventually $T_3$ can drive the carrier 74 through the planetary gear set 80—82—84 faster than $T_2$ can drive this carrier 74 through the gear set 70—72—76 which has a greater speed reduction than that of the gear set 80—82—84. At this point the one-way torque-establishing device or clutch 68 breaks away and the sun gear 70 rotates forward, the turbine $T_2$ being disconnected from the drive and floating idly in the stream of oil.

Now $T_3$ is driving the output shaft 16 through the planetary reduction gear set 80—82—84 and the shaft 16 is also being driven by $T_4$ through the planetary reduction gear set 86—88—92 and by the turbine $T_5$ directly. As the speed of the output shaft further increases and as $T_3$ approaches its terminal speed the turbine $T_4$ drives the carrier 90 and the output shaft through the reduction gear 86—88—92 faster than the output shaft can be driven by the turbine $T_3$ through the reduction gear set 80—82—84 which has a lower speed ratio than that of the reduction gear 86—88—92. At this point the freewheeler 78 breaks away and the shaft 16 is driven solely by the two turbines $T_4$ and $T_5$, all of the other turbines being disconnected from the drive and floating idly in the oil stream.

As $T_4$ approaches its terminal speed and the torque of $T_4$ decreases and the torque of $T_5$ increases the point is reached at which the turbine $T_5$ can drive the carrier 90 and the output shaft 16 faster than the turbine $T_4$ can drive them through the reduction gear set 84—86—92. At this point the free-wheeler 94 breaks away allowing the sun gear 92 to rotate forward and the turbine $T_4$ to float idly in the oil stream. $T_5$ is now driving the output shaft alone, the torque converter being in effect a single turbine torque converter which multiplies torque according to the characteristics of the turbine blades 32 and provides a gradually decreasing torque ratio with increasing speed of the output shaft until the output shaft is rotating approximately as fast as the turbine impeller I and the condition known as coupling occurs.

Fig. 2 shows diagrammatically the relationship of the blades of the torque converter to one another. This figure is a developed or unrolled diagram of the cross sections or traces of the blades on a cylindrical surface representing the flow of oil according to the line 22 in Fig. 1. The blades are represented as moving from the top toward the bottom of the drawing as shown by the rotation arrow in Fig. 2 and oil is represented as flowing from right to left as indicated by the oil flow arrow.

The discharge angle of a blade is the angle formed between two planes, the first of which is determined by the axis of the transmission and a radial line passing through the tail edge of the blade and the second of which is tangent at the tail to the camber surface of the blade. The camber surface is that curved surface determined by the axes of all circular cylinders which can be placed within the blade so that each cylinder is tangent to both side surfaces of the blade. Angles are measured between those portions of the planes extending from the intersections of the planes in the axial direction of oil flow and the angle is considered positive when measured from the radial and axial plane in the direction in which oil tends to move the blade. This terminology is explained in greater detail, and is illustrated in my application for U.S. Patent S.N. 537,472, filed September 29, 1955, the disclosure of which is incorporated herein by reference.

The torque which a turbine delivers is influenced by the velocity of oil striking the blades and by the angle in space through which the turbine blade deflects the oil. This angle is influenced in turn not only by the difference between the absolute direction in space of the incident oil and the exit angle of the blade itself, but also by the speed of the blade. The entrance angle of incidence of the blade itself does not importantly effect the angle through which the oil is turned. Oil strikes the blade in a direction determined by conditions upstream of the blade and this direction is wholly independent of the shape of the blade. Oil leaves the blade in a direction determined both by the shape of the blade and the speed of its movement. The entrance angle is chosen to reduce shock loss or spatter of the incident oil, and so the incident angle affects the efficiency of the turbine but not its torque-multiplying characteristic.

In Fig. 2 line 98 is the trace of the radial and axial plane through the tail of the impeller blade 20; the line 100 is the trace of a plane which is parallel to the radial and axial planes through the tails of the turbine blades 24 to 30; the line 102 is the trace of a plane parallel to the radial and axial plane through the tail of the $T_5$ blade 32. Line 104 is the trace of the plane tangent at the tail of the impeller blade 20 to the camber surface of that blade. Similarly, the lines 106, 108, 110, 112 and 114 are the traces of planes tangent at the tails to the camber surfaces of blades 24—32 respectively. From this it is seen that the discharge angle of the impeller blade 20 is about plus 45°; that the blade 24 of $T_1$ has a discharge angle of about —49°; that the $T_2$ blade 26 has an angle of about —57°; and $T_3$ blade 28 about —63°; $T_4$ blade 30 about —66°; and $T_5$ blade 32 about —45°.

The blades, both pump and turbine, are shaped as shown in Fig. 2 and as explained in greater detail in my application S.N. 537,472 referred to. The design and arrangement of the blades in combination with the successively decreasing mechanical advantages of the connections of the various turbines to the output shaft assures that on starting $T_1$ will develop the highest hydrodynamic torque, and that this will be multiplied and applied to the output shaft by the connection of lowest speed ratio, that is of highest torque ratio or mechanical advantage. Also, as the hydrodynamic torque developed by the first turbine is inherently decreasing with increasing turbine speed, the hydrodynamic torque of each of the downstream turbines $T_2$, $T_3$, $T_4$ and $T_5$, as influenced by upstream functioning turbines, is increasing. For example, the hydrodynamic torque of $T_2$ increases from its starting value (which may be low at stall) to a maximum, which maximum occurs when the free-wheeler 67 breaks away and $T_1$ idles, the torque of $T_1$ being zero at this point. Thereafter, the torque of $T_2$ decreases as the speed of the load shaft (and of turbine $T_2$) increases in the known manner of single turbines, for $T_2$ is now in effect the first turbine in the hydrodynamic series because $T_1$ has no hydrodynamic effect. While the torque of $T_2$ is decreasing the hydrodynamic torque of each of $T_3$, $T_4$ and $T_5$ is increasing. When $T_2$ reaches its terminal speed its torque becomes zero, the free-wheeler 68 breaks away and the torque of $T_3$ is at its maximum. Then $T_3$ becomes the first turbine of the hydrodynamic series and its torque decreases as its speed increases, following the laws of single turbines. Likewise, each successive turbine $T_4$ and $T_5$ develops increasing torque to a maximum which occurs when the preceding turbine begins to idle, and thereafter develops decreasing torque. Finally, as the speed of output shaft increases, $T_1$, $T_2$, $T_3$ and $T_4$ have all been disconnected from the output shaft and $T_5$ alone drives the load.

The conditions just described are illustrated in Fig. 4. The curve labelled torque ratio shows the overall torque ratio of the transmission shown in Fig. 1, plotted against output shaft speed in rotations per minute for a given speed or throttle opening of a driving engine. This shows that at stall the sum of the hydrodynamic torque ratios of all the turbines, each multiplied by the torque ratio of its connection to the output shaft, is very high, being above 4, and off the scale of the curve. It may be of the order of 8 or more. As the shaft 16 begins to turn, the torque ratio decreases rapidly until at about 450 r.p.m. the ratio is about 3.4, as indicated on the torque ratio curve by the point 100. The break or sharp change of slope at this point of the curve indicates that the free-wheeler 67 and the sun gear 66 are running forward and that the first turbine is disconnected from the drive, as explained above. Thereafter, as the speed of the output shaft increases the torque ratio of the transmission as a whole decreases more slowly than before until at about 750 r.p.m. the torque ratio is about 2.2 as indicated by the point 102, where the break in the curve indicates that the second turbine $T_2$ is disconnected from the drive. Thereafter as the speed of the output shaft increases the torque ratio of the transmission as a whole decreases more slowly than it did between point 100 and point 102 until at about 1240 r.p.m. the torque ratio is about 1.4 as indicated at the point 104, where the break in the curve indicates that the third turbine $T_3$ is disconnected from the drive and that only $T_4$ and $T_5$ are driving the output shaft. Thereafter as the speed of the output shaft increases the torque ratio of the transmission as a whole decreases even more slowly until at about 2000 r.p.m. the torque ratio is theoretically 1.0, but actually slightly less, for example .98 due to friction losses. This is indicated by the point 106 on the torque ratio curve at which point the freewheeler 94 has begun to run forward to disconnect the fourth turbine $T_4$ from the drive. Now $T_5$ alone is driving the output shaft in the condition known as coupling.

It will be observed that on starting the efficiency curve follows the typical efficiency curve of torque converters and that between about 300 r.p.m. output shaft speed and 450 r.p.m. the transmission is operating near its peak efficiency, namely between about 75% and 77% as shown by the efficiency curve between the points 108 and 110. The point 110 occurs at the same output shaft speed as the point 100 on the torque ratio curve and indicates that when the first turbine has been disconnected from the drive the falling efficiency begins to increase again. This increase continues until a maximum of about 78% is reached at about 600 r.p.m., after which the efficiency curve droops in typical manner until the point 112 is reached, which is the same time that point 102 is reached and is when the second turbine is disconnected from the drive at about 750 r.p.m. The efficiency is now approximately 75%. After the second turbine is disconnected from the drive the efficiency curve again rises from point 112 to a maximum of about 78%, which is reached at about 1000 r.p.m. output shaft speed. The curve thereafter droops to the point 114 which occurs at about 1240 r.p.m., that is where the third turbine is disconnected from the drive. Thereafter with increasing output shaft speed the efficiency rises to about 80% at about 1800 r.p.m., following which the curve droops slightly until the output shaft speed is about 2000 r.p.m. and the fourth turbine is disconnected from the drive as indicated at the point 116. The transmission is now in coupling condition and the efficiency curve is substantially flat in the neighborhood of 80%, increasing slightly with increasing speed. The succession of humps in the efficiency curve, namely from 108 to 110, from 110 to 112, from 112 to 114, and from 114 to 116 provide a close approach to a substantially flat efficiency curve varying from about 75% at about 300 r.p.m. to about 80% at speeds above 1800 r.p.m. This arrangement of turbines thus provides a transmission having a substantially constant efficiency varying from about 75% to 81% at all speeds above 300 r.p.m. This is a very desirable condition and one which has not heretofore been achieved with hydrodynamic torque converters.

*Structure*

When Fig. 3 is fitted on the left of Fig. 3A these figures collectively show one example of actual structure of a transmission embodying the invention diagrammatically illustrated in Fig. 1.

The casing 44 of the transmission includes a cylindrical shell 200, a front flange 202 and a combined front bearing retainer and gear shaft support 204. The casing 44 also includes a combined rear flange and bearing support 206, a planetary gear housing 208, a rear flange 210 and a rear bearing retainer 212. The input shaft 10 is splined to a drive flange 214 by which the transmission can be connected to any suitable engine, not shown. The drive shaft and drive flange assembly are supported for rotation in the casing 44 by any suitable anti-friction bearings 216 in the bearing retainer 204. The drive shaft 10 may be formed integral with a flange or drum 218 to which is fastened the ring gear 46 which meshes with any suitable number of gears 58, for example three, which in turn mesh with the input sun gear 50 which drives the impeller through the drive sleeve 52. The gears 58 are mounted on fixed spindles 220 which form part of the support 204 which corresponds to the support 42 in Fig. 1. The ground shaft 40 is keyed to the support 204 at 222 so that the shaft 40 is rigidly supported by the casing 44. Rotation of the drive flange 214 clockwise rotates the impeller I counterclockwise, as is known.

The support 204 has passages 224 communicating with a passage 226 in the ground shaft 40 and with lubrication passages 228 in spindles 220. The passages 224 and 226 form a conduit for conveying charging and lubricating oil into or out of the transmission through an exterior connection 230 in the carrier and front bearing retainer 204. The impeller is supported for rotation by a pair of spaced friction bearings 232 between the shaft 40 and the drive sleeve 52. As will be explained more fully below the shaft 40 also serves as support for the stator, the fourth turbine $T_4$ and the planetary gear set 86—88—90 and for this reason the shaft 40 requires support at its left end which is remote from its keyed connection at 222 to the carrier.

All of the turbines, except the fourth turbine $T_4$, and their output shafts are supported for rotation by the front flange 202 and/or the rear flange 206 of the casing 44 by a series of anti-friction bearings, as will now be explained.

The first turbine $T_1$ is formed as part of a cylindrical shell 240 secured to a front flange 242 and a rear flange 244, all of which elements together form a casing or container for the torque converter which is kept filled with liquid under pressure as is customary. A sealing flange 246 secured to the front flange 242 maintains sealing contact with the impeller drive sleeve 52. An anti-friction bearing 248 between the sealing flange 246 and the carrier 204 supports the $T_1$ assembly for rotation at its front end. The $T_1$ assembly is supported for rotation at its rear end by an anti-friction bearing 250 between the rear flange 206 and a bearing sleeve 252 bolted to the flange 244. The ring gear 60, by which the turbine $T_1$ is connected to the drive, may be bolted between the bearing sleeve 252 and the rear flange 244. The container formed by the $T_1$ shell and flanges may be sealed to the carrier 64 by a sealing flange 252 attached to the ring gear 60, which flange maintains a sealing contact with a collar 254 forming part of carrier 64. The reaction sun gear of the planetary gearset 60—62—66 may be formed integral with the inner race 256 of the free-wheeler which corresponds to the free-wheeler 67 of Fig. 1, and which is locked against reverse rotation by rollers or sprags 258 bearing against an outer race formed as part of the casing flange 206.

The carrier 64 which drives the sun gear 70 is formed as part of the rotating assembly of the second turbine $T_2$. This assembly includes the turbine $T_2$ formed as part of a cylindrical shell 260 secured to a flange 262 in turn secured to a bearing hub 264 which is formed integral with a drive sleeve 266, which is keyed to the outer race 268 of a one-way torque-establishing device corresponding to the free-wheeler 68 in Fig. 1. The outer race 268 drives the sun gear 70 only forward through sprags or rollers 270 which bear against an inner race formed integral with the sun gear 70. This free-wheeler may be of a known construction which provides bearing support for the outer race 268 on the inner race. The carrier 64 includes a flange 272 formed integral with the previously described sealing collar 254 which is bolted to the bearing hub 264 and thus attaches the carrier 64 to the $T_2$ assembly. The entire $T_2$ assembly is supported for rotation by an anti-friction bearing 274 between the bearing hub 264 and a bearing ring or support 276 bolted to the rear flange 244 of the $T_1$ assembly. It will be seen that the bearing 250 supports the $T_1$ assembly from the flange 206 of the casing 44 and that the $T_1$ assembly in turn supports the $T_2$ assembly. The $T_2$ assembly is also supported through the bearing formed in the free-wheeler 268—270, the sun gear 70 in turn being supported on the $T_3$ assembly, as will now be explained.

The $T_3$ assembly includes the turbine proper $T_3$ formed as part of a cylindrical shell 280 which is secured to a flange 282 fastened to a drive shaft 284 which drive shaft is supported for rotation at its front end by an anti-friction bearing 286 between the drive shaft 284 and the bearing hub 264 of the $T_2$ assembly, and for rotation at its rear end by an anti-friction bearing 288 which is supported by the rearmost planetary gear set and by the output shaft 16.

The output shaft 16 is supported for rotation at its rear end by one or more anti-friction bearings 290 in the rear bearing retainer 212 and is supported for rotation at its front end by an anti-friction bearing 292 in the front end of the $T_3$ drive shaft 284. This arrangement supports the output shaft at its two ends, one end being the direct bearing support 290 in the casing itself and the other being the series or stack of anti-friction bearings 292—286—274—250 leading to the casing. The output shaft can therefore assist in supporting the rear end of the ground shaft 40 and this is accomplished by the pilot bearing 294.

The carrier 74 of the rear planetary gear sets is supported for rotation by an anti-friction bearing 296 mounted between the casing flange 206 and the front flange 298 forming part of the carrier. The rear flange 300 of the carrier 74 is bolted to a drive sleeve 302 which contains a pair of one-way torque-establishing devices 304 which together correspond to the one-way torque-establishing device 78 in Fig. 1 through which the first three turbines drive the output shaft. The drive sleeve 302 is supported for rotation on the output shaft 16 by an anti-friction bearing 306. The bearings 296 and 306 thus support the carrier 74 in the casing 44. The rear flange 300 of the carrier contains the previously-mentioned anti-friction bearing 288 which supports the rear end of the $T_3$ drive shaft 284. Thus the drive 284 and the entire $T_3$ assembly are supported for rotation jointly by the bearings 286 and 288. It was previously stated that the sun gear 70 is supported for rotation on the drive shaft 284, and this is accomplished by bearing sleeves 310, which thus assist in supporting the $T_2$ assembly. The spindles 312 of the carrier 74, carrying planet gears 72 and 82, are supported between the flanges 298 and 300 in the usual manner. The fixed ring reaction gears 76 and 84 which mesh respectively with the planet gears 72 and 82 are secured to the housing 208 and the casing 44 by any suitable means such as bolts 314. The sun gear 70 previously described meshes with the planet gears 72 and thus drives the carrier 74 whenever the sun gear 70 is driven by $T_1$ assembly or $T_2$ assembly. The sun gear 80 by which the $T_3$ assembly drives the planet carrier 74 through the planet gear 82 is keyed to the rear end of the $T_3$ drive shaft 284.

The $T_4$ assembly includes the turbine proper $T_4$ mounted on spider 316 connected to a hub 318 supported on anti-friction bearings 320 on the ground shaft 40. The ring gear 86 is suitably bolted to the hub 318. The planet gears 88 which mesh with the ring gear 86 are mounted on the spindles 322 forming part of the carrier 90 which includes the flange 324 keyed to the front end of the output shaft 16 and bolted to a ring 326 secured to the fifth turbine $T_5$. The reaction sun gear 92 which meshes with a planet gear 88 is supported for rotation by bearing sleeve 328 on the rear end of the ground shaft 40 and is formed integral with the outer race 330 of a one-way torque-establishing device corresponding to the one-way torque-establishing device 94 in Fig. 1 and having sprags or rollers 332 which run on the inner race 96 formed at the rear end of the ground shaft 40 to prevent reverse rotation and permit forward rotation of the sun gear 92 in the usual manner.

The liquid circulated by the pump and leading from the fifth turbine $T_5$ to the pump passes through any suitable form of stator, reaction member, or guide wheel R having blades 34. The particular form of the reaction member constitutes no part of the present invention but it may be constructed, for example, as disclosed in German Patent 949,024 issued Sept. 13, 1956, the disclosure of which is incorporated herein by reference.

The stator is supported for rotation on the ground shaft 40 by any suitable bearing and is locked against reverse rotation by any suitable one-way torque-establishing device corresponding to the one-way torque establishing device in Fig. 1.

It has been mentioned that the turbines are connected to the output shaft through connections of successively decreasing mechanical advantage, the mechanical advantage of $T_1$ being highest and $T_5$ being directly connected to the output shaft. The size of the various gears through which the turbines are connected to the output shaft may be so selected that the torque multiplication or mechanical advantage of the connection of $T_1$ through the double reduction to the output shaft is approximately 6.5 to 1. The speed ratio of $T_2$ may be about 4.0 to 1, while the speed ratio of the connection of $T_3$ may be about 2.6 to 1 and that of $T_4$ of about 1.6 to 1.

It will be understood that both the diagrammatic disclosure in Fig. 1 and the structure disclosed in Figs. 3 and 3A are only illustrative and that other forms of the device may be made without departing from the invention as defined in the claims. In these, various sub-combinations are claimed broadly. For example, while a series of five turbines is disclosed, certain sub-combinations of less than five turbines are believed to be novel, and have been claimed without regard to the remaining turbines. Thus, some of the claims define a series of three turbines and refer to the last turbine of that series, which for the purposes of such claims may be the second from the last or third from last in the entire series of five in the illustrative embodiment of the invention. Also, all turbines of the series receive liquid circulated by the impeller and each may be regarded as receiving liquid from the impeller, even if there are other turbines between the impeller and the turbine under consideration. Thus, the fifth turbine $T_5$ is regarded as receiving liquid from the impeller. Likewise, any turbine which is downstream of any other turbine receives liquid from such other turbine, for example the fifth turbine $T_5$ may be regarded as receiving liquid from any one of the first four turbines.

I claim:

1. A transmission comprising in combination a hydrodynamic impeller, an output shaft and means for rotating the output shaft at a plurality of ranges of speed ratios with respect to the impeller including two planetary gearsets of different speed ratios having a common output carrier connected to drive the output shaft, each of the gearsets having an input gear, a reaction gear, and planet gears mounted on said carrier and meshing with the input and reaction gears, a series of turbines hydrodynamically driven by the impeller, one of the turbines being adapted to receive liquid from the impeller and to deliver liquid successively to the remaining turbines of the series, a driving connection between the last turbine of the series to receive liquid and the input gear of the gearset having the higher speed ratio, a one-way driving connection between the next-to-last turbine of the series and the other input gear, and still another planetary gearset having an input gear connected to the first-mentioned turbine, a reaction gear, and an output member having a one-way driving connection with the second-mentioned input gear.

2. A transmission comprising in combination a hydrodynamic impeller, an output shaft and means for rotating the output shaft at a plurality of ranges of speed ratios with respect to the impeller including two planetary gearsets of different speed ratios having a common output carrier connected to drive the output shaft, each of the gearsets having an input gear, a reaction gear, and planet gears mounted on said carrier and meshing with the input and reaction gears, a series of turbines hydrodynamically driven by the impeller, one of the turbines being adapted to receive liquid from the impeller and to deliver liquid successively to the remaining turbines of the series, a driving connection between the last turbine of the series to receive liquid and the input gear of the gearset having the higher speed ratio, a one-way driving connection between the next-to-last turbine of the series and the other input gear, and still another planetary gearset having an input gear connected to the first-mentioned turbine, a reaction gear, and an output carrier connected to the next-to-last turbine of the series.

3. A transmission comprising in combination a hydrodynamic impeller, an output shaft and means for rotating the output shaft at a plurality of ranges of speed ratios with respect to the impeller including two planetary gearsets of different speed ratios having a common output carrier connected to drive the output shaft, each of the gearsets having an input gear, a reaction gear, and planet gears mounted on said carrier and meshing with the input and reaction gears, a series of turbines hydrodynamically driven by the impeller, one of the turbines being adapted to receive liquid from the impeller and to deliver liquid successively to the remaining turbines of the series, a driving connection between the last turbine of the series to receive liquid and the input gear of the gearset having the higher speed ratio, a one-way driving connection between the next-to-last turbine of the series and the other input gear, and still another planetary gearset having an input gear connected to the first-mentioned turbine, a forwardly rotatable reaction gear held against reverse rotation, and an output carrier connected to the next-to-last turbine of the series.

4. A transmission comprising in combination a hydrodynamic impeller, an output shaft and means for rotating the output shaft at different ranges of speed ratios with respect to the impeller including two planetary gearsets of different speed ratios having a common output carrier connected to drive the output shaft in the forward sense of rotation only, each of the gearsets having an input gear, a reaction gear and planet gears mounted on said carrier and meshing with the input and reaction gears, a series of turbines adapted to receive successively liquid circulated by the impeller, a drive connection between one turbine and the input gear of the gear set having the higher speed ratio, a one-way drive connection between the turbine preceding the first-mentioned turbine and the other input gear, still another planetary gearset having an input gear connected to the turbine which first receives liquid from the impeller and having a forwardly rotatable reaction gear held against reverse rotation and having an output member provided with a one-way drive connection with the second-mentioned input gear, and a fourth turbine receiving liquid from the first-mentioned turbine and having a drive connection with the output shaft independent of said carrier.

5. A transmission comprising in combination a hydrodynamic impeller, an output shaft and means for rotating the output shaft at different ranges of speed ratios with respect to the impeller including two planetary gearsets of different speed ratios having a common output carrier connected to drive the output shaft in the forward sense of rotation only, each of the gearsets having an input gear, a reaction gear and planet gears mounted on said carrier and meshing with the input and reaction gears, a series of turbines adapted to receive successively liquid circulated by the impeller, a drive connection between one turbine of the series and the input gear of the gearset having the higher speed ratio, a one-way drive connection between the turbine preceding the first-mentioned turbine and the other input gear, still another planetary gearset having an input gear connected to the turbine which first receives liquid from the impeller and having a forwardly rotatable reaction gear held against reverse rotation and having an output member provided with a one-way drive connection with the second-mentioned input gear, and a fourth turbine receiving liquid from the first-mentioned turbine and having a drive connection with the output shaft independent of said carrier, the connection of said fourth turbine and the output shaft including a fourth planetary gearset having an input gear, a reaction gear and an output carrier connected to the output shaft.

6. A transmission comprising in combination a hydrodynamic impeller, an output shaft and means for rotating the output shaft at different ranges of speed ratios with respect to the impeller including two planetary gearsets of different speed ratios having a common output carrier connected to drive the output shaft in the forward sense of rotation only, each of the gearsets having an input gear, a reaction gear and planet gears mounted on said carrier and meshing with the input and reaction gears, a series of turbines adapted to receive successively liquid circulated by the impeller, a drive connection between one turbine of the series and the input gear of the gearset having the higher speed ratio, a one-way drive connection between the turbine preceding the first-mentioned turbine and the other input gear, still another planetary gearset having an input gear connected to the turbine which first receives liquid from the impeller and having a forwardly rotatable reaction gear held against reverse rotation and having an output member provided with a one-way drive connection with the second-mentioned input gear, a fourth turbine receiving liquid from the first-mentioned turbine and having a drive connection with the output shaft independent of said carrier, the connection of said fourth turbine and the output shaft including a fourth planetary gearset having an input gear, a reaction gear and an output carrier connected to the output shaft, and a fifth turbine connected to the carrier of the fourth gearset.

7. A transmission comprising in combination a hydrodynamic radial outflow impeller, an output shaft and means for rotating the output shaft at different ranges of speed ratios with respect to the impeller including two planetary gearsets of different speed ratios having a common output carrier connected to drive the output shaft in the forward sense of rotation only, each of the gearsets having an input gear, a reaction gear and planet gears mounted on said carrier and meshing with the input and reaction gears, a series of axial flow turbines adapted to receive successively liquid circulated by the impeller, a drive connection between one turbine of the series and the input gear of the gearset having the higher speed ratio, a one-way drive connection between the turbine preceding the first-mentioned turbine and the other input gear, still another planetary gearset having an input gear connected to the turbine which first receives liquid from the impeller and having a forwardly rotatable reaction gear held against reverse rotation and having an output member provided with a one-way drive connection with the second-mentioned input gear, a fourth turbine receiving liquid from the first-mentioned turbine and having a drive connection with the output shaft independent of said carrier, the connection of said fourth turbine and the output shaft including a fourth planetary gearset having an input gear, a reaction gear and an output carrier connected to the output shaft, and a radial inflow turbine connected to the carrier of the fourth gearset and adapted to receive liquid from the axial flow turbines and to return the liquid to the impeller.

8. In a transmission having a hydrodynamic torque transmitting device, the combination of an impeller for circulating liquid through a series of turbines; an output shaft; a first planetary gearset having an input gear connected to the first turbine of the series and having a forwardly rotatable reaction gear held against reverse rotation and having a planetary gear meshing with the input and reaction gears and having an output member; a second planetary gearset including an input gear adapted to be driven by the output member of the first gearset and having a reaction gear and having planet gears mounted on an output carrier and meshing with the input and reaction gears and having a one-way driving connection with the output shaft; a second turbine receiving liquid from the first turbine and adapted to drive the output member of the first gear set; a third planetary gearset having an input gear connected to a third turbine receiving liquid from the second turbine and having a reaction gear, and having planet gears mounted on the carrier of the second gearset and meshing with the input and reaction gears; a one-way drive connection between the output member of the first gearset and the input gear of the second gearset; a fourth turbine receiving liquid from the third turbine; a fourth planetary gearset having a forwardly rotatable reaction gear held against reverse rotation and having an input gear connected to the fourth turbine and having planet gears mounted on a carrier connected to the output shaft and meshing with the input and reaction gears; and a fifth turbine receiving liquid from the fourth turbine and connected to the output shaft.

9. In a transmission having a hydrodynamic torque transmitting device, the combination of an impeller for circulating liquid through a series of turbines; an output shaft; a first planetary gearset having an input gear connected to the first turbine of the series and having a forwardly rotatable reaction gear held against reverse rotation and having a planetary gear meshing with the input and reaction gears and having an output member; a second planetary gearset including an input gear adapted to be driven by the output member of the first gearset and having a reaction gear and having planet gears mounted on an output carrier having a one-way driving connection with the output shaft and meshing with the input and reaction gears; a second turbine receiving liquid from the first turbine and adapted to drive the output member of the first gear set; a third planetary gearset having an input gear connected to a third turbine receiving liquid from the second turbine, having a reaction gear, and having planet gears mounted on the carrier of the second gear set and meshing with the input and reaction gears; the third gearset having a mechanical advantage less than that of the second gearset; a one-way drive connection between the output member of the first gearset and the input gear of the second gearset; a fourth turbine receiving liquid from the third turbine; a fourth planetary gearset and having a mechanical advantage less than that of the third gearset and having a forwardly rotatable reaction gear held against reverse rotation and having an input gear connected to the fourth turbine and having planet gears mounted on a carrier connected to the output shaft and meshing with the input and reaction gears; and a fifth turbine receiving liquid from the fourth turbine and connected to the output shaft.

10. In a transmission having a hydrodynamic torque transmitting device, the combination of an impeller for circulating liquid through a series of turbines; an output shaft; a first planetary gearset having an input gear connected to the first turbine of the series and having a forwardly rotatable reaction gear held against reverse rota-
tion and having an output member and having a planetary gear meshing with the input and reaction gears; a second planetary gearset including an input gear adapted to be driven by the output member of the first gearset and having a reaction gear and having planet gears mounted on an output carrier having a one-way driving connection with the output shaft and meshing with the input and reaction gears; a second turbine receiving liquid from the first turbine and adapted to drive the output member of the first gear set; a third planetary gearset having an input gear connected to a third turbine receiving liquid from the second turbine having a reaction gear, and having planet gears mounted on the carrier of the second gearset and meshing with the input and reaction gears; the third gearset having a mechanical advantage less than that of the second gearset; a one-way drive connection between the output member of the first gearset and the input gear of the second gearset; a fourth turbine receiving liquid from the third turbine; a fourth planetary gearset and having a mechanical advantage less than that of the third gear set and having a forwardly rotatable reaction gear held against reverse rotation and having an input gear connected to the fourth turbine and having planet gears mounted on a carrier connected to the output shaft and meshing with the input and reaction gears; and a fifth turbine receiving liquid from the fourth turbine and connected to the output shaft, each turbine having the characteristic of providing torque which decreases as the speed of the turbine increases when no turbine preceding it in the series is exerting torque on the output shaft, the first turbine having the characteristic of providing torque which is high at stall and decreases to a vanishing point, and each successive turbine of the series having the characteristic of exerting torque on the output shaft which increases as the turbine speed increases while any turbine preceding it in the series is exerting torque and decreases as the speed of the turbine increases when there is no preceding turbine in the series exerting torque on the output shaft.

References Cited in the file of this patent
UNITED STATES PATENTS

| | | |
|---|---|---|
| 2,293,358 | Pollard | Aug. 18, 1942 |
| 2,316,390 | Biermann | Apr. 13, 1943 |
| 2,578,450 | Pollard | Dec. 11, 1951 |
| 2,795,154 | Russell | June 11, 1957 |

FOREIGN PATENTS

| | | |
|---|---|---|
| 666,092 | Great Britain | Feb. 6, 1952 |